(12) United States Patent
Palladino

(10) Patent No.: US 7,559,384 B2
(45) Date of Patent: Jul. 14, 2009

(54) VEHICLE ELECTRIFICATION USING A CLUTCHED VIBRATION DAMPER

(75) Inventor: James Palladino, Winona Lake, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 414 days.

(21) Appl. No.: 11/557,682

(22) Filed: Nov. 8, 2006

(65) Prior Publication Data

US 2008/0121445 A1   May 29, 2008

(51) Int. Cl.
 *B60K 17/28* (2006.01)
(52) U.S. Cl. ............ 180/53.8; 310/98; 310/100; 192/45; 192/45.1; 474/70
(58) Field of Classification Search .......... 180/53.8, 180/53.7, 53.5, 53.1; 310/92, 96, 98, 100, 310/112, 113; 192/45, 45.1; 474/69, 70, 474/74, 135
See application file for complete search history.

(56) References Cited

U.S. PATENT DOCUMENTS

| 3,731,774 | A | * | 5/1973 | Kitchin | 192/45 |
| 5,638,931 | A | * | 6/1997 | Kerr | 192/45 |
| 6,048,288 | A | | 4/2000 | Tsujii et al. | |
| 6,129,189 | A | * | 10/2000 | Kerr | 192/45 |
| 6,846,257 | B2 | | 1/2005 | Baker et al. | |
| 6,919,711 | B2 | | 7/2005 | Haydock et al. | |
| 6,936,933 | B2 | | 8/2005 | Wilmore | |
| 6,949,041 | B2 | | 9/2005 | Fujioka et al. | |
| 7,013,646 | B1 | | 3/2006 | Serkh et al. | |
| 7,017,692 | B2 | | 3/2006 | Grassl et al. | |
| 7,028,794 | B2 | | 4/2006 | Odahara et al. | |
| 7,182,707 | B2 | * | 2/2007 | Nakamura | 474/70 |
| 2003/0209373 | A1 | * | 11/2003 | Egami et al. | 180/53.8 |
| 2004/0251758 | A1 | | 12/2004 | Wilmore | |
| 2005/0284720 | A1 | * | 12/2005 | Ogata et al. | 192/45 |
| 2008/0067025 | A1 | * | 3/2008 | Yamakawa | 192/45 |

* cited by examiner

*Primary Examiner*—Ruth Ilan
*Assistant Examiner*—Drew J. Brown
(74) *Attorney, Agent, or Firm*—Jeffrey P. Calfa; Mark C. Bach

(57) ABSTRACT

A driving system of a motor vehicle for providing vehicle propulsion power and accessory power includes an engine having an accessory belt providing power to at least one accessory machine and a motor/generator operatively connected to the accessory belt for alternately driving and being driven by the accessory belt. A one-way clutch vibration damper includes an engine input member and a belt interface. The input member is concentrically disposed with respect to the belt interface and is attached to an engine crankshaft for transmitting torque in a pre-determined direction. The belt interface rotates freely when torque applied by the motor/generator through the accessory belt is greater than the torque applied by the input member. The belt interface rotates at the same rotational speed as the input member when torque transmitted through the accessory belt is less than or in the opposite direction as the rotation of the input member.

21 Claims, 5 Drawing Sheets

VEHICLE ELECTRIFICATION USING A CLUTCHED VIBRATION DAMPER

BACKGROUND OF THE INVENTION

The present invention relates generally to power systems in vehicles. More specifically, the present invention relates to a power system having both a standard mode and an electrified mode to operate engine accessories.

Automotive vehicles typically have a drive system for powering engine accessories such as alternators, water pumps, air conditioning compressors, power steering pumps, radiator cooling fans, etc. The drive system is powered by torque from a pulley mounted on the crankshaft on an engine. The crankshaft converts the reciprocal motion of the engine's pistons into a rotational motion, which in turn, rotates the pulley and drives an accessory belt. The accessory belt winds through the various engine accessories providing them with mechanical power.

Powering the accessories is a secondary function of the engine, the primary function of the engine being providing power for propulsion. In many cases, the conventional drive system is inadequate to supply power to the various accessories. One situation in which the conventional drive system is inadequate is when the vehicle is stationary. In this situation, the engine must run at an idle to provide power to the accessories.

A second situation in which the conventional drive system is inadequate is when the vehicle propulsion requires an extreme load on the engine, and the engine cannot provide adequate power to both propel the vehicle and power the accessories. An example of an extreme loading on the engine is when the vehicle is climbing a hill with the accessories running. Under these circumstances, the loading applied to the engine for powering the accessories is called a "parasitic" loading because it can negatively impact the amount of power delivered for propulsion. Currently, engines are "sized up" to be large enough to deliver adequate power for propulsion and for accessories.

Thus, there is a need for a drive system that provides an adequate amount of power to both engine propulsion and engine accessories.

There is also a need for a drive system that powers accessories when the vehicle is stationary and without requiring the engine to idle.

There is a further need for a drive system that removes parasitic loading on the engine when it is under heavy loads.

BRIEF SUMMARY OF THE INVENTION

The above-listed needs are met or exceeded by the present driving system of a motor vehicle for providing vehicle propulsion power and vehicle accessory power. The driving system includes an engine having an accessory belt providing power to at least one accessory machine and a motor/generator operatively connected to the accessory belt for alternately driving the accessory belt and being driven by the accessory belt. A one-way clutch vibration damper includes an engine input member and a belt interface. The engine input member is concentrically disposed with respect to the belt interface, and the engine input member is attached to an engine crankshaft for transmitting torque in a pre-determined direction. The belt interface rotates freely when torque applied by the motor/generator through the accessory belt is greater than the torque applied by the engine input member. The belt interface rotates at the same rotational speed as the engine input member when torque transmitted through the accessory belt is less than or in the opposite direction as the rotation of the engine input member.

An alternate embodiment of a driving system of a motor vehicle for providing vehicle propulsion power and vehicle accessory power includes an engine having an accessory belt providing power to at least one accessory machine and a motor/generator operatively connected to the accessory belt for alternately driving the accessory belt in a pre-determined direction and being driven by the accessory belt. A one-way clutch vibration damper includes an engine input member and a belt interface, with the engine input member being concentrically disposed with respect to the belt interface, and the engine input member being attached to an engine crankshaft for transmitting torque in the same pre-determined direction. The driving system includes a controller for selectively providing a sufficient amount of power to the motor/generator to transmit a torque that exceeds the torque produced by the engine input member.

Also provided is a one-way clutch vibration damper for a driving system of a motor vehicle for providing vehicle accessory power alternately from an engine and a motor/generator. The one-way clutch vibration damper includes a belt interface configured for receiving an accessory belt, an internal ring concentrically disposed inside the belt interface, and an engine input member concentrically disposed inside the internal ring, where the engine input member is configured for attachment to an engine crankshaft for transmitting torque to the belt interface in a pre-determined direction. At least one roller is disposed between the engine input member and the internal ring. The belt interface rotates about the engine input member freely when torque is applied by the accessory belt powered in the pre-determined direction that is greater than the torque applied by the engine input member, and the belt interface rotates at the same rotational speed with the engine input member when the torque from the accessory belt is less then or in the opposite direction as the rotation of the engine input member.

DETAILED DESCRIPTION OF THE INVENTION

Figure 1:
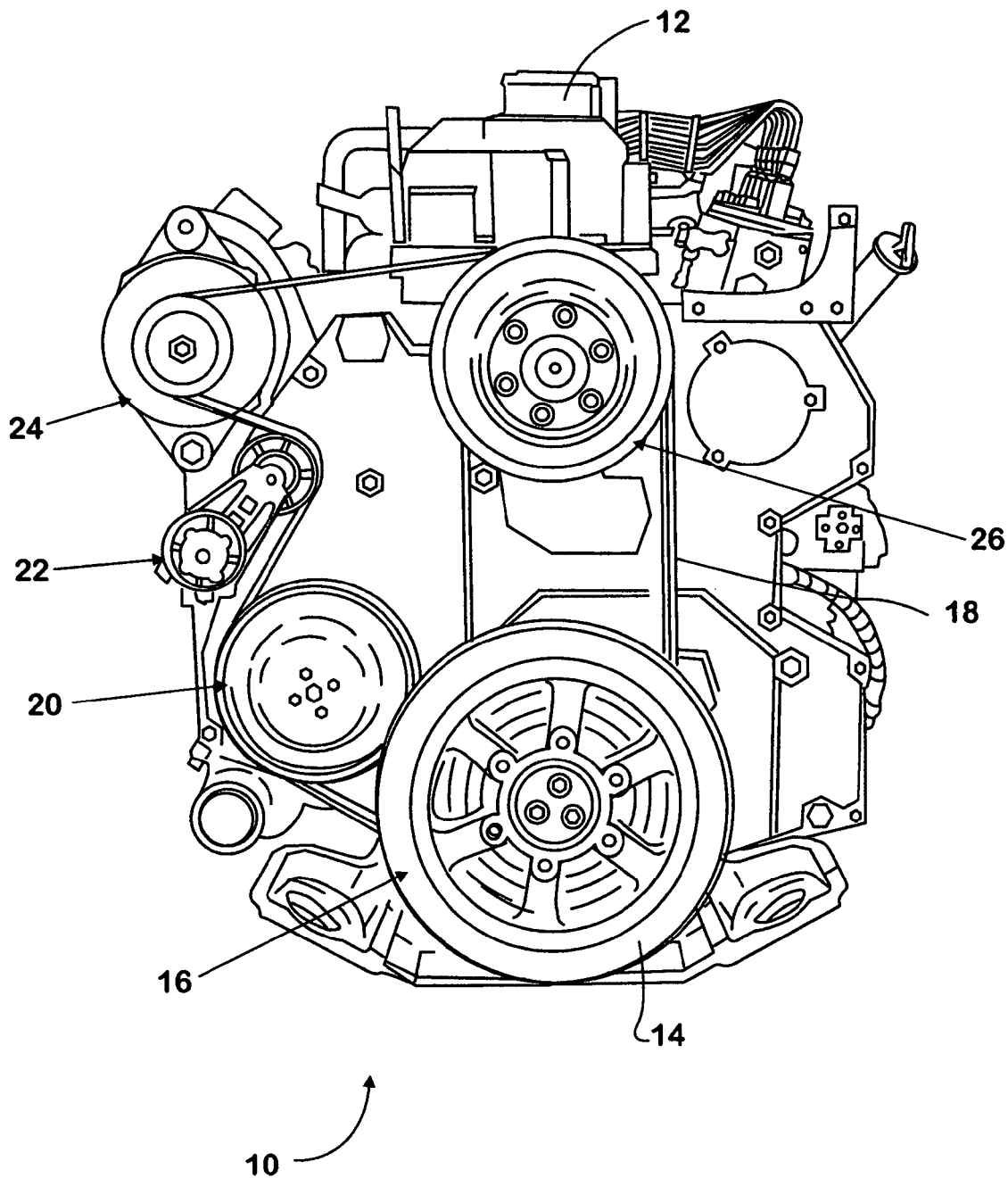
FIG. 1 is a plan view of a prior art drive system having a standard vibration damper and a standard alternator.

Referring now to FIG. 1, a prior art driving system assembly is depicted generally at 10, and is disposed on an engine 12. The drive system 10 is conventionally powered by torque from a pulley 14 mounted on the crankshaft (not shown) of the engine 12. A vibration damper 16 is typically implemented on the pulley 14 and connected to the crankshaft to lessen the torsional vibration between the crankshaft and the pulley 14. An accessory belt 18 mounted on the pulley 14 winds through the various accessories. In this particular engine 12, the accessory belt 18 extends from the pulley 14 to a water pump pulley 20, to a fan belt auto tensioner 22, to an alternator 24, to a fan drive pulley 26, and back to the vibration damper 16. It should be understood that the number, type and arrangement of the various accessories can be modified depending on the engine 12 and the vehicle.

In many cases the prior art driving system 10 is inadequate to fulfill the vehicle's accessory and propulsion requirements. Powering the accessories is a secondary function of the engine 12, the primary function of the engine being to provide power for propulsion. However, the engine 12 can provide only a limited amount of power. For example, when the vehicle is climbing a hill and the air conditioning is on, in some cases the engine 12 cannot provide both adequate propulsion and air conditioning. Another circumstance where the prior art driving system 10 is undesirable is where the engine 12 is run solely to power the accessories. For example, when a vehicle is stationary, the engine must idle to provide air conditioning.

Figure 2:
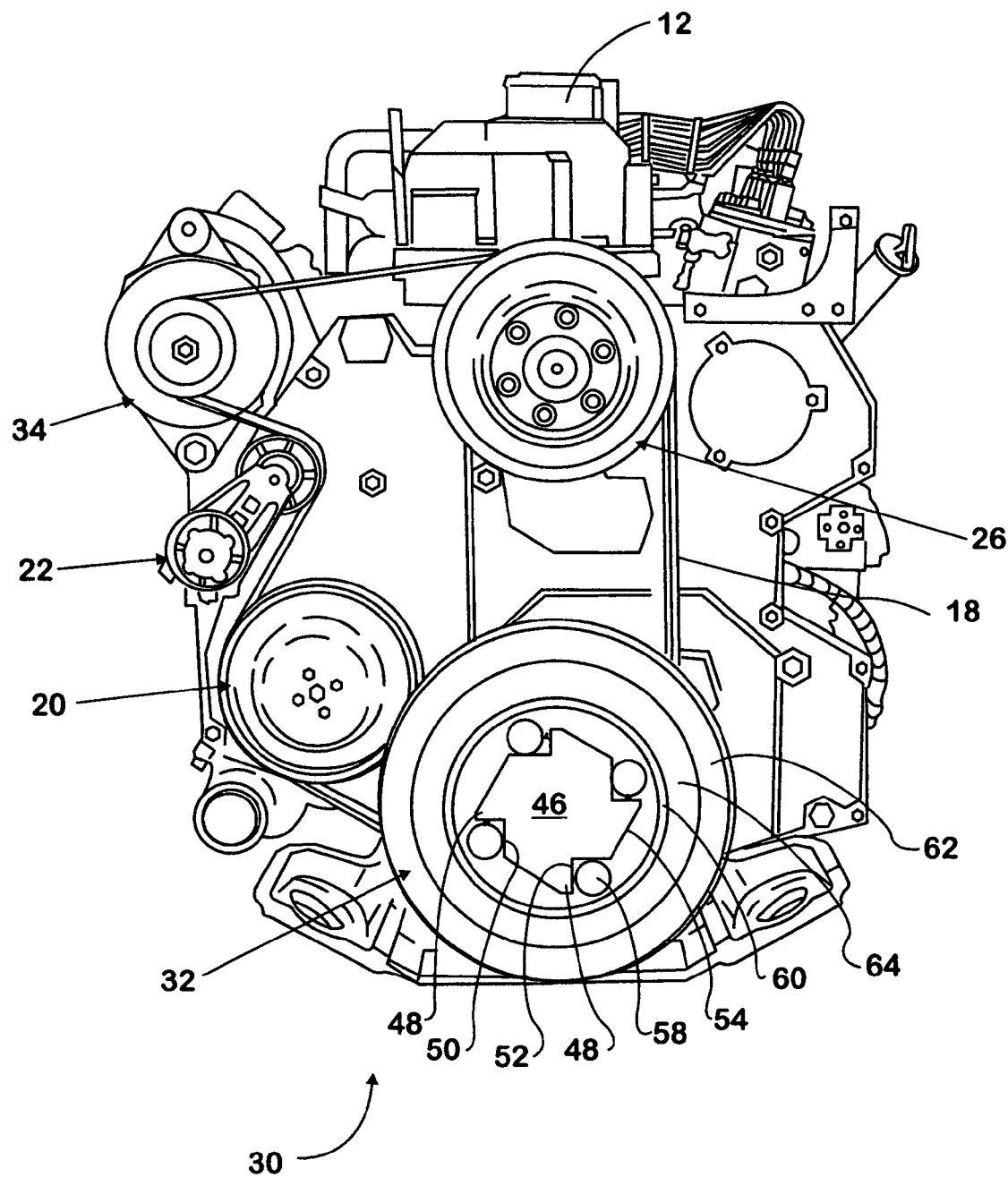
FIG. 2 is a plan view of a drive system of the present invention having a one-way clutch assembly and a motor/generator.
Figure 4:
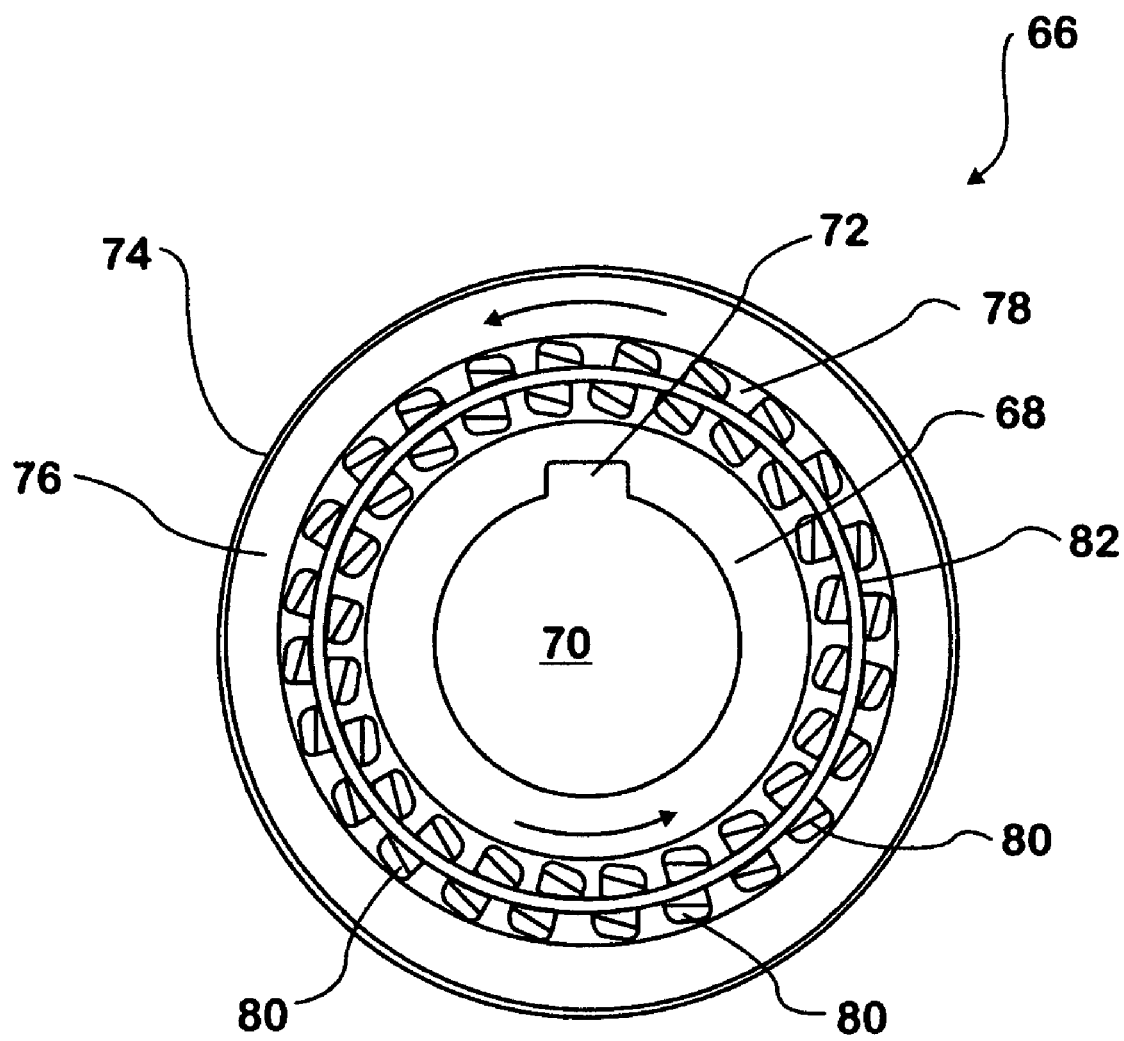
FIG. 4 is an alternate embodiment of a one-way clutch assembly.

Referring now to FIG. 2, the present driving system is depicted generally at 30, and like components are designated with like numbers. The present driving system 30 is generally similar to the conventional driving system 10 in that the present driving system incorporates the same engine 12 and the same accessories. In the driving system 30, the standard vibration damper 16 of FIG. 1 is replaced with a vibration damper incorporating a one-way clutch assembly 32 (also known as a ratcheting pulley assembly and a one-way clutch vibration damper), and the alternator 24 of FIG. 1 is replaced with a motor/generator 34. Further, and as seen in FIG. 4, a multi-function converter 36 replaces the conventional voltage regulator (not shown) associated with the alternator 24.

While motor/generators 34 are currently used in vehicles with small gasoline engines, the motor/generators of the prior art systems are used for starting the engine or providing supplemental power for propulsion. In contrast, the present driving system 30 uses the one-way clutch assembly 32 to allow the motor/generator 34 to drive the engine accessories.

Specifically, the driving system 30 includes the accessory belt 18 that is mounted on the one-way clutch assembly 32 and winds through the various accessories. In the engine 12, the accessory belt 18 extends from the one-way clutch assembly 32 to a water pump pulley 20, to a fan belt auto tensioner 22, to the motor/generator 34, to a fan drive pulley 26, and back to the ratcheting pulley assembly. Again, it should be understood that the number, type and arrangement of the various accessories can be modified on the engine 12 without departing from the present driving system 30.

The driving system 30 operates in two modes, a "standard mode" and an "electrified mode." In the standard mode, the driving system 30 operates similarly to a conventional driving system 10 with the engine 12 powering the accessories and the motor/generator acting as an alternator 24. Specifically, the drive system 30 is powered by torque from the one-way clutch assembly 32 mounted on the crankshaft (not shown) of the engine 12. The accessory belt 18 is mounted on the one-way clutch assembly 32 and winds through the various accessories to power them. The standard mode is the default mode and will typically operate when the vehicle is running under normal traveling conditions.

However, when the engine 12 cannot deliver the desired power to drive the accessories, for example when the engine is off, or when the engine is under an extreme propulsion load, for example during hill climbs, the drive system 30 can switch to the electrified mode. In the former situation, the electrified mode supplies power to the accessories to obviate the need for engine 12 idling. In the latter situation, when the engine 12 is under extreme propulsion loading, the electrified mode can temporarily drive the accessory belt 18 faster than the crankshaft. This removes the parasitic loading from the engine 12 and frees more power for propulsion, which produces a mild hybrid affect.

In the electrified mode, the motor/generator 34 acts like a motor and drives the accessory belt 18, which in turn operates the engine accessories. In the electrified mode, the one-way clutch assembly 32 disengages from the engine 12 crankshaft. The motor/generator 34 is powered electrically through a variety of electrical power sources 38 including batteries and ultra-capacitors 40, shore (utility) power 42, and remote power units and fuel cells 44.

Figure 3:
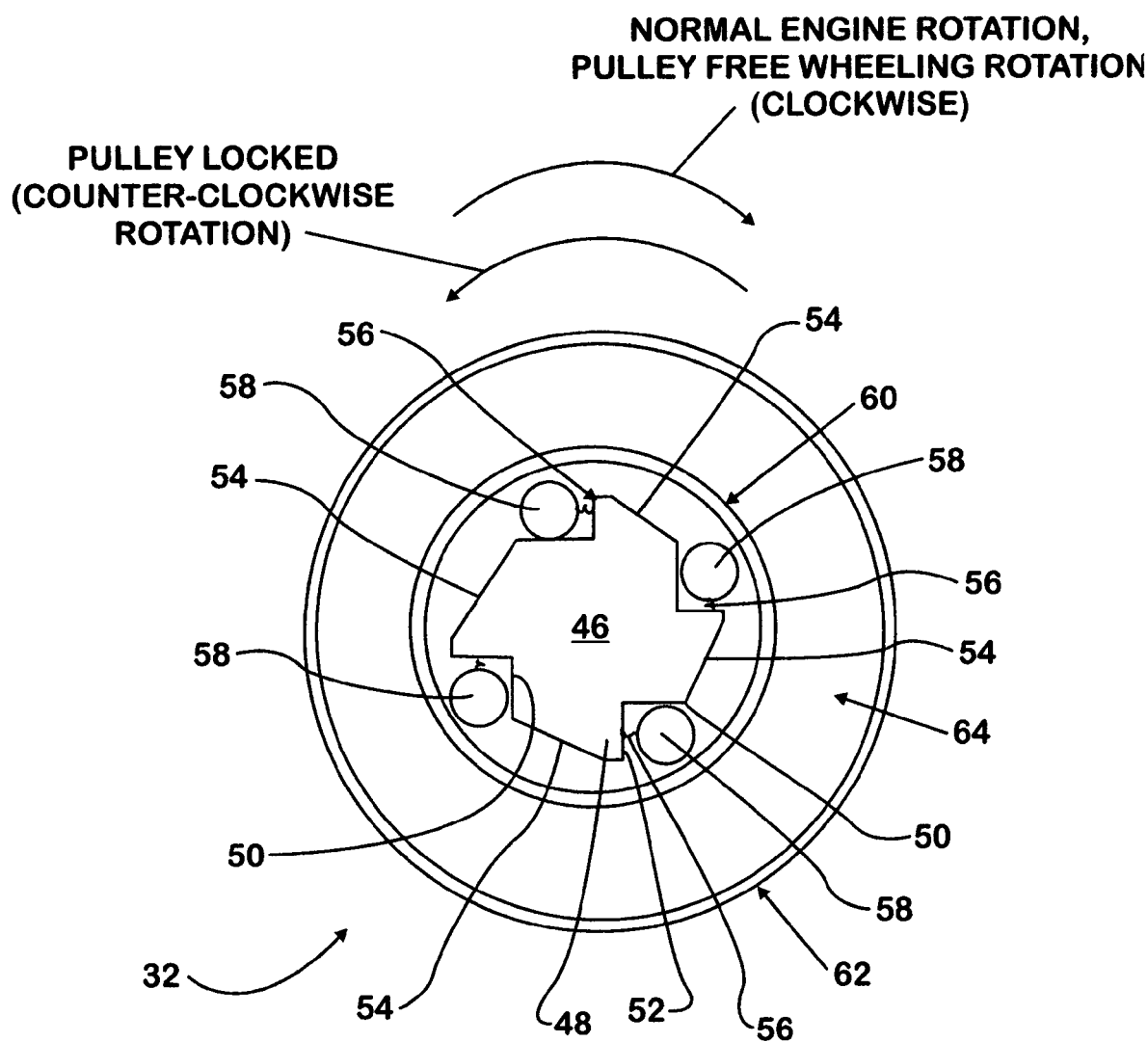
FIG. 3 is a plan view of the one-way clutch assembly of FIG. 2.

Referring now to FIG. 3, the preferred embodiment of ratcheting pulley assembly or one-way clutch 32 is shown. The one-way clutch assembly 32 includes a centrally disposed engine input member 46 attached to or extending from the engine 12 crankshaft. In the preferred embodiment, the engine input member is a hub 46. The hub 46 rotates with the engine 12 crankshaft (in this case, in the clockwise direction). The hub 46 preferably has a plurality of projections 48 forming a "roller-ramp" type bearing.

Each projection 48 on the hub 46 includes a rotating surface 50, a perpendicular surface 52 and a connecting surface 54 extending between the rotating surface and the perpendicular surface of adjacent projections. The perpendicular surface 52 is generally perpendicular to the rotating surface 50. A spring 56 preferably extends generally perpendicularly away from the perpendicular surface 41 and generally tangential to the direction of rotation of the hub 46 (in this example, clockwise).

At least one roller 58 is preferably disposed at each spring 45, and is preferably bounded by the perpendicular surface 52, the rotating surface 50 and an internal ring 60. The internal ring 60 is engaged by each roller 58. The spring 56 acts to push the roller 58 in the direction opposing rotation (in this case, the counter clockwise direction), and cause the hub and ring to bind when this opposing rotation occurs.

A belt interface 62 is attached to and concentrically disposed with the internal ring 60 and is configured for receiving the accessory belt 18. Preferably located between the internal ring 60 and the belt interface 62 is a shock absorbing medium 64 configured to absorb the shock of sudden engagement with the accessory belt 18. Together, the internal ring 60, the shock absorbing medium 64 and the belt interface 62 rotate together about the hub 46.

Generally, when the rotating hub 46 is implemented on the engine 12 crankshaft, the ratcheted pulley assembly 32 allows free rotation of the internal ring 60 and belt interface 62 when torque is applied from the accessory belt 18 and causes a rotation (in a clockwise direction) that is equal to or greater than the (clockwise) rotational speed of the hub 46. However, if the incident torque applied through the accessory belt 18 would causes a rotation that is less than the rotational speed of the hub 46 (or is counterclockwise), the internal ring 60 will bind to the hub 46 and rotate at the same speed as the hub (the engine 12 will drive the accessory belt).

Specifically, as shown in FIG. 3, when a counter-clockwise torque (relative to the rotation of the hub 46) is applied on the belt interface 62, the rollers 58 bind the hub 46 to the internal ring 60, locking the ring to rotate with the hub. When a clockwise torque is applied to the belt interface 62, the internal ring 60 can freely rotate about the hub 46. Thus, the belt interface 62 can only rotate at the same speed as the hub 46 in the clockwise direction, or faster than the hub in the clockwise direction. The belt interface 62 cannot rotate counter-clockwise (relative to the hub). In other words, if a clockwise rotation of the hub 46 is assigned a "zero" speed, the belt interface 62 can only rotate at the same relative speed or faster than the hub in the clockwise direction. The belt interface 62 cannot travel with a negative speed.

In this manner, the accessory belt 18 can be driven faster than or equal to the engine drive speed of the hub 46, but never slower or in the opposite direction. This establishes the standard mode, or engine initiated drive power as the fail-safe mechanism for accessory power. The fail safe mode may be initiated when the electrified mode runs out of electrical power, and the motor/generator 34 cannot rotate the accessory belt 18 as fast as the hub 46 can at that particular point in time.

While a preferred embodiment of a one-way clutch assembly 32 is depicted in FIG. 3 as a "roller-ramp" type ratcheted pulley assembly, other types of assemblies can be used. Referring to FIG. 4, an alternate one-way clutch assembly 66 has a "sprag" type configuration. The sprag clutch assembly 66 has an internal ring 68 that is engaged by an input member 70 transmitting power from the engine 12 crankshaft. In the alternate embodiment, the input member is a rotating hub 70, although other input members are contemplated. The hub 70 has at least one projection 72 that engages with the internal ring 68.

A belt interface 74 is disposed on an external ring 76, which is concentrically disposed with the internal ring 60. The belt interface 74 is configured for receiving the accessory belt 18. Located in an annular space 78 between the internal ring 68 and the external ring 76 is a plurality of shaped sprags 80. The sprags 80 are preferably linked by an expanding coil spring 82.

When the external ring 76 is moved in a first direction, the sprags 80 tilt in the first direction, and when the external ring is moved in a second direction, the sprags tilt in the second direction. The sprags 80 are shaped to have a first tilt dimension and a second tilt dimension that is smaller than the first tilt dimension. In this configuration, the rotation of the internal ring 68 or external ring 76 in a first direction causes the sprag 80 to tilt and bind against both the internal and external rings, thereby transmitting torque from the hub 70 to the belt interface 74. Conversely, rotation of the internal ring 68 or external ring 76 in a second direction causes the sprag 80 to tilt and free the sprags, thereby permitting the external ring to rotate freely about the hub 70.

Figure 5:
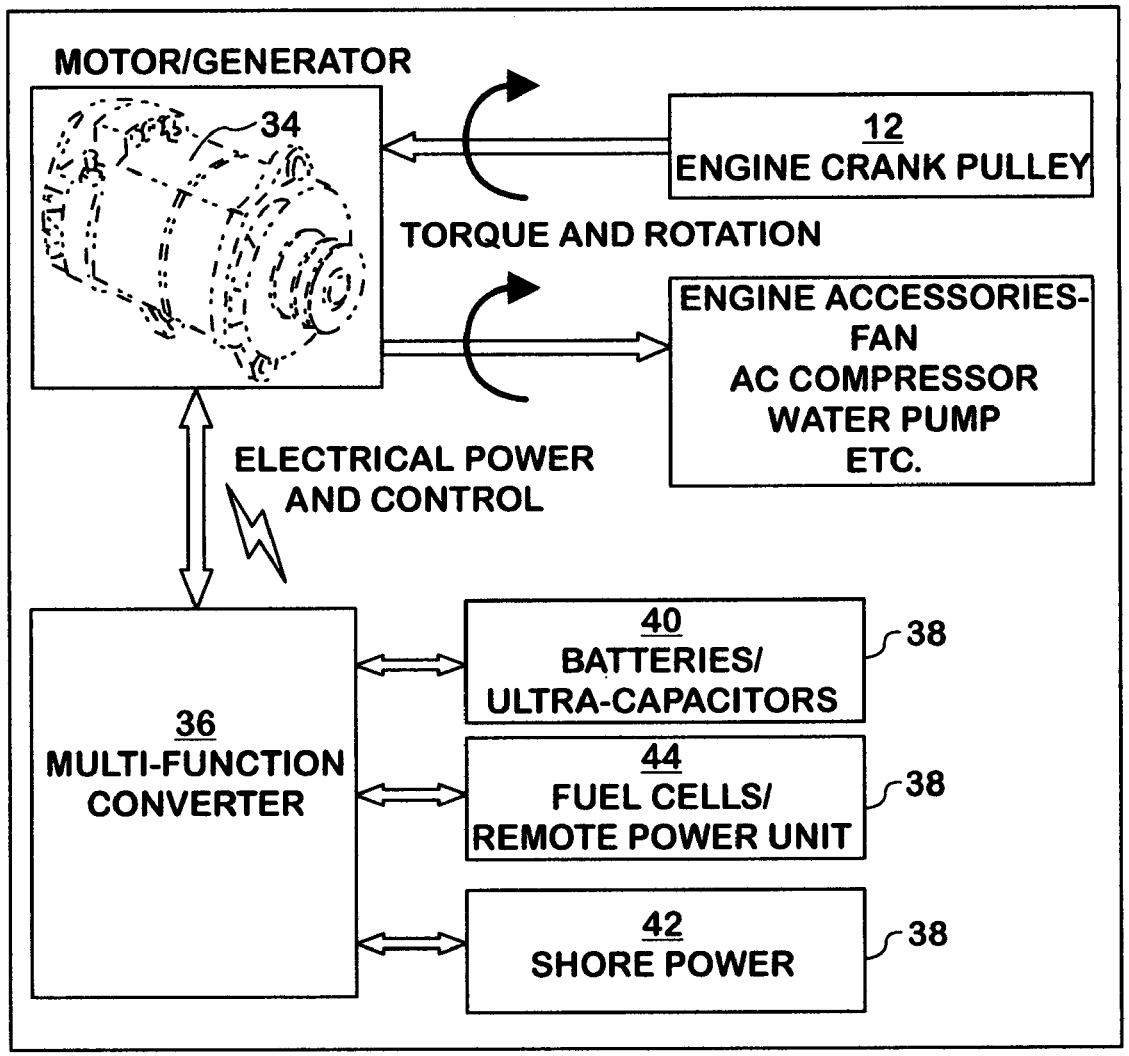
FIG. 5 is a block diagram of the operation of the present drive system.

FIG. 5 is a block diagram showing the operation of the motor/generator 34 and management of electrical power on the vehicle. The multi-function converter or controller 36 replaces the typical voltage regulator associated with the alternator 24, and provides power conversion and control functions, which includes monitoring the status of the vehicle, such as engine conditions, battery state of charge, among other things. Based on vehicle conditions and operator actions, such as a request for air conditioning, the controller 36 determines the mode of the motor/generator 34 by supplying electrical power to it or extracting electrical power from it. Under normal operating conditions (engine running) the controller 36 extracts electrical power from the motor/generator 34 and supplies power to batteries 38 and other devices. In the electrified mode, the controller 36 supplies electrical power to the motor/generator which converts it to mechanical power for driving the accessory belt.

The present driving system 30 can operate at voltages higher than 12 volts when necessary to achieve high efficiencies and high power output. The present driving system 30 also allows auxiliary or "key off" power to be utilized from a number of power sources 38 including batteries and super capacitors 40, shore (utility) power 42, and fuel cells and remote power sources 44.

The electrified mode supplies power to the accessories to obviate the need for engine 12 idling. Such accessories include the air conditioning and the water pump. For example, the air conditioning could run in the vehicle without the engine 12 idling ("key-off") if the vehicle had an adequate source of power 38, such as a remote power unit or a fuel cell 44. Vehicles equipped with an adequate battery bank 40 could also achieve anti-idling through engine on/off cycling, with the batteries running the air conditioning compressor.

Powering accessories in the electrified mode also improves the anti-idling performance of the vehicle, particularly in winter and when remote power 44 is not available. For example, running the water pump in the electrified mode results in better residual heat extraction from the engine 12, reducing or eliminating the need for an auxiliary electric heater.

Thus, by running accessories in the electrified mode, components can be eliminated from the vehicle. Further, incorporating an electrified mode into the present driving system 30 can result in an engine 12 that is sized smaller, since the engine can be used strictly for propulsion during times of peak power demand. Further still, the accessories can be run in the standard mode should the electrified mode fail. Additionally, the present driving system 30 achieves the electrified mode without significant changes to the present automotive design.

While particular embodiments of the present driving system 30 have been shown and described, it will be appreciated by those skilled in the art that changes and modifications may be made thereto without departing from the invention in its broader aspects and as set forth in the following claims.

I claim:

1. A driving system of a motor vehicle for providing vehicle propulsion power and vehicle accessory power, comprising:
    an engine having an accessory belt providing power to at least one accessory machine;
    a motor/generator operatively connected to said accessory belt for alternately driving said accessory belt and being driven by said accessory belt;
    a one-way clutch vibration damper having an engine input member and a belt interface, said engine input member being concentrically disposed with respect to said belt interface, and said engine input member being attached to an engine crankshaft for transmitting torque in a pre-determined direction;
    wherein said belt interface rotates freely when torque applied by said motor/generator through said accessory belt in said pre-determined direction is greater than the torque applied by said engine input member, and said belt interface rotates at the same rotational speed with said engine input member when the torque transmitted through said accessory belt is less than or in the opposite direction as the rotation of said engine input member.

2. The driving system of claim 1 wherein said one-way clutch vibration damper interrupts transmission of rotation of said engine input member to said accessory belt when said motor/generator drives said accessory belt in a state where the engine is running.

3. The driving system of claim 1 wherein said one-way clutch vibration damper interrupts transmission of rotation of said engine input member to said accessory belt when said motor/generator drives said accessory belt in a state where the engine is off.

4. The driving system of claim 1 further comprising a controller that operates said motor/generator to automatically drive said accessory belt when said engine input member delivers torque that is less than the torque that can be delivered by said motor/generator.

5. The driving system of claim 4 wherein said controller operates said motor/generator with a power source including one of a battery, super capacitors, shore power, fuel cell and remote power source.

6. The driving system of claim 1 wherein when the torque applied by said motor/generator is less than the torque applied by said engine input member, the engine will drive said accessory belt.

7. The driving system of claim 1 wherein said one-way clutch vibration damper further comprises an internal ring and at least one roller disposed between said engine input member and said internal ring.

8. The driving system of claim 7 wherein said rotation of said belt interface at a slower rotational speed than said engine input member, or in the opposite direction of said pre-determined rotational direction of said engine input member, is prevented by said at least one roller binding said engine input member to said ring.

9. The driving system of claim 7 wherein said one-way clutch vibration damper further comprises a shock medium concentric with and disposed between said internal ring and said belt interface.

10. The driving system of claim 1 wherein said one-way clutch vibration damper is one of a "roller-ramp" design and a "sprag" design.

11. A driving system of a motor vehicle for providing vehicle propulsion power and vehicle accessory power, comprising:
 an engine having an accessory belt providing power to at least one accessory machine;
 a motor/generator operatively connected to said accessory belt for alternately driving said accessory belt in a pre-determined direction and being driven by said accessory belt;
 a one-way clutch vibration damper having an engine input member and a belt interface that is rotational about said engine input member, said engine input member being concentrically disposed with respect to said belt interface, and said engine input member being attached to an engine crankshaft for transmitting torque in the same pre-determined direction; and
 a controller for selectively providing a sufficient amount of power to said motor/generator to transmit a torque that exceeds the torque produced by said engine input member.

12. The driving system of claim 11 wherein said controller operates said motor/generator with a power source including one of a battery, super capacitors, shore power, fuel cell and remote power source.

13. The driving system of claim 11 wherein said one-way clutch vibration damper interrupts transmission of rotation of said engine input member to said accessory belt when said motor/generator applies the torque to said belt interface in a state where the engine is running.

14. The driving system of claim 11 wherein said one-way clutch vibration damper interrupts transmission of rotation of said engine input member to said accessory belt when said motor/generator applies the torque to said belt interface in a state where the engine is off.

15. The driving system of claim 11 wherein said one-way clutch vibration damper further comprises an internal ring and at least one roller disposed between said engine input member and said internal ring.

16. The driving system of claim 15 wherein said rotation of said belt interface at a slower rotational speed than said engine input member, or in the opposite direction of said pre-determined rotational direction of said engine input member, is prevented by said at least one roller binding said engine input member to said ring.

17. A one-way clutch vibration damper for a driving system of a motor vehicle for providing vehicle accessory power alternately from an engine and a motor/generator, comprising:
 a belt interface configured for receiving an accessory belt;
 an internal ring moveable with and concentrically disposed inside said belt interface;
 an engine input member concentrically disposed inside said internal ring, said engine input member being configured for attachment to an engine crankshaft for transmitting torque to said belt interface in a pre-determined direction;
 at least one roller disposed between said engine input member and said internal ring;
 wherein said belt interface rotates freely when torque applied by said motor/generator through said accessory belt in said pre-determined direction is greater than the torque applied by said engine input member, and said belt interface rotates at the same rotational speed with said engine input member when the torque transmitted through said accessory belt is less than or in the opposite direction as the rotation of said engine input member.

18. The one-way clutch vibration damper of claim 17 wherein said belt interface is alternately driven by the engine and the motor/generator.

19. The one-way clutch vibration damper of claim 17 wherein said engine input member comprises a plurality of projections including a rotating surface and a perpendicular surface generally perpendicular to the rotating surface, wherein said at least one roller is bounded by said rotating surface, said perpendicular surface and said internal ring, and further wherein said roller can only rotate in one direction.

20. The one-way clutch vibration damper of claim 19 further comprising a spring extending generally perpendicularly away from said perpendicular surface and generally tangential to the direction of rotation of said engine input member.

21. The one-way clutch vibration damper of claim 17 further comprising a shock medium concentric with and disposed between said internal ring and said belt interface.

* * * * *